United States Patent
Hellings et al.

(10) Patent No.: US 11,391,692 B2
(45) Date of Patent: Jul. 19, 2022

(54) FIELD-EFFECT TRANSISTOR-BASED BIOSENSOR

(71) Applicant: IMEC VZW, Leuven (BE)

(72) Inventors: Geert Hellings, Halle (BE); Koen Martens, Ghent (BE)

(73) Assignee: IMEC VZW, Leuven (BE)

( * ) Notice: Subject to any disclaimer, the term of this patent is extended or adjusted under 35 U.S.C. 154(b) by 358 days.

(21) Appl. No.: 16/556,689

(22) Filed: Aug. 30, 2019

(65) Prior Publication Data

US 2020/0072788 A1 Mar. 5, 2020

(30) Foreign Application Priority Data

Sep. 5, 2018 (EP) ...................................... 18192768

(51) Int. Cl.
*G01N 27/414* (2006.01)

(52) U.S. Cl.
CPC ................................ *G01N 27/4145* (2013.01)

(58) Field of Classification Search
None
See application file for complete search history.

(56) References Cited

U.S. PATENT DOCUMENTS

| | | |
|---|---|---|
| 2004/0222446 A1 | 11/2004 | Yang |
| 2006/0154400 A1 | 7/2006 | Choi et al. |
| 2012/0143027 A1 | 6/2012 | Phillips et al. |
| 2013/0158378 A1 | 6/2013 | Berger et al. |
| 2014/0054651 A1 | 2/2014 | Bashir et al. |
| 2015/0125872 A1 | 5/2015 | Chen et al. |
| 2015/0268208 A1 | 9/2015 | Rhodes et al. |
| 2016/0011186 A1 | 1/2016 | Oldham |
| 2017/0114402 A1 | 4/2017 | Lee et al. |
| 2017/0227533 A1 | 8/2017 | Lin et al. |

*Primary Examiner* — J. Christopher Ball
(74) *Attorney, Agent, or Firm* — McDonnell Boehnen Hulbert & Berghoff LLP

(57) ABSTRACT

A sensor is provided, the sensor including a field effect transistor comprising: (a) an active region comprising: (i) a source region and a drain region defining a source-drain axis and (ii) a channel region between the source region and the drain region; (b) a dielectric region on the channel region, comprising at least a first zone on a first portion of the channel region and a second zone on a second portion of the channel region, the first zone measuring from 1 to 100 nm in the direction of the source-drain axis and being adapted to create a different threshold voltage for the first portion of the channel region than for the second portion of the channel region, and (c) a fluidic gate region to which a top surface of the dielectric region is exposed. A biosensing device comprising such a sensor, a method for using such a sensor, and a process for making such a sensor are also provided.

21 Claims, 14 Drawing Sheets

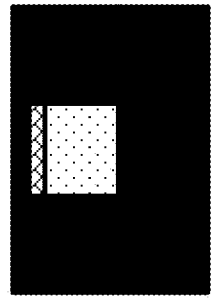
FIG. 14
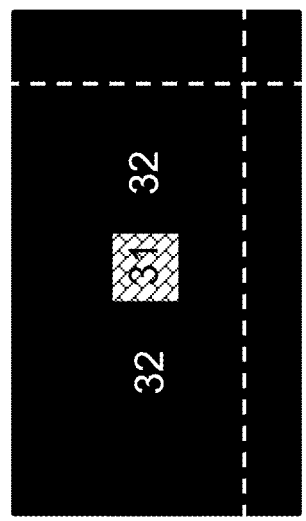

FIELD-EFFECT TRANSISTOR-BASED BIOSENSOR

CROSS-REFERENCE TO RELATED APPLICATION

The present application is a non-provisional patent application claiming priority to European Patent Application No. 18192768.2, filed Sep. 5, 2018, the contents of which are hereby incorporated by reference in its entirety.

TECHNICAL FIELD OF THE DISCLOSURE

The present disclosure relates to the field of Field-effect transistor-based biosensors (bioFETs) and to method of making and using the same.

BACKGROUND OF THE DISCLOSURE

BioFETs sense molecules as charge or dielectric displacements close to their gate dielectric. These transistors do not have their solid gate electrode directly in contact with the gate dielectric. Instead, they have a liquid electrolyte gate in contact with the gate dielectric and the solid gate electrode is in electrical contact with the liquid electrolyte gate. The sensed molecules are located in this liquid gate at or near the gate dielectric surface. The molecular charge or dielectric displacement near the gate dielectric causes a change in the current running through the semiconductor channel of the device as dictated by the disturbance in the electrical potential landscape these molecules cause. Such devices are currently considered promising for single molecule detection and highly sensitive molecular detection.

One of the main contemporary obstacles inhibiting the effectivity of such single molecule and highly sensitive FET devices is the weak signal a single electronic charge/molecule generates for FET devices of a size currently deemed manufacturable in top-down semiconductor manufacturing technologies. One key cause of the weak signal is the screening of molecular charges by the electrolyte. For biologically relevant sensing applications, the salt concentration should be near physiological levels which introduces significant screening. The physiological NaCl concentration is 154 mM at which the Debye length becomes smaller than 1 nm. Depending on the application, salinity can be lowered but screening remains a central issue. A second key issue is bio-fouling which originates from non-target molecules which bind to the FET sensor and cause false signals.

Hence, there is a need in the art for BioFETs overcoming at least partly one or more of the above issues.

SUMMARY OF THE DISCLOSURE

It is an object of the present disclosure to provide an apparatus or method for sensing molecules in a liquid medium.

One benefit of sensors according to embodiments of the present disclosure is that they are sensitive. For instance, in some embodiments, single molecules can be detected.

Another benefit of sensors according to embodiments of the present disclosure that they are selective and specific and are not very much impacted by fouling.

Another benefit of sensors according to embodiments of the present disclosure is that they are relatively inexpensive to produce. An alternative way to increase sensitivity would be to shorten the channel length by shortening the distance between the source region and the drain region but the smaller this distance, the more difficult it becomes to form steep doping profiles for the source and drain, hence increased costs. Embodiments of the present disclosure permit to obtain the sensitivity of a shorter such distance without having to actually shorten that distance.

The above objective can be accomplished by a method and device according to the present disclosure.

In a first aspect, the present disclosure relates to a sensor. The sensor comprises a field effect transistor. The field effect transistor comprises an active region. The active region comprises a source region and a drain region defining a source-drain axis. The active region further comprises a channel region between the source region and the drain region. The field effect transistor further comprises a dielectric region. This dielectric region can be on the channel region. This dielectric region comprises at least a first zone on a first portion of the channel region and a second zone on a second portion of the channel region. The first zone measures from 1 to 100 nm in the direction of the source-drain axis. The first zone is adapted to create a different threshold voltage for the first portion of the channel region than for the second portion of the channel region. The field effect transistor further comprises a fluidic gate region to which a top surface of the dielectric region is exposed.

In embodiments, the first zone may be adapted to create a different threshold voltage for the first portion by having a different dielectric charge density at the interface between the first zone and the first portion.

In a second aspect, the present disclosure relates to a biosensing device comprising a sensor according to any embodiment of the first aspect.

In a third aspect, the present disclosure relates to a process for forming a sensor according to any embodiment of the first aspect, comprising the steps of:
a. Providing an active region (typically on a substrate), the active region having a source region, a drain region and a channel region therebetween,
b. Providing a dielectric region on the channel region, the dielectric region comprising at least a first zone on a first portion of the channel region and a second zone on a second portion of the channel region, the first zone measuring from 1 to 100 nm and usually at most 50 nm in the direction of the source-drain axis and being adapted to create a different threshold voltage for the first portion of the channel region than for the second portion of the channel region, and
c. Providing a fluidic gate region to which a top surface of the dielectric region is exposed.

In a fourth aspect, the present disclosure relates to a method for detecting the possible presence of an analyte in a liquid medium.

In an embodiment, the method may comprise the steps of:
a. Providing a sensor according to any embodiment of the first aspect,
b. Applying a gate potential and measuring a first current between the source region and the drain region,
c. Introducing the liquid medium potentially containing the analyte in the fluidic gate region, and
d. Measuring a second current between the source region and the drain region, thereby detecting the analyte.

After step c, the first zone is in contact with the liquid medium.

Particular and preferred aspects of the disclosure are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present disclosure will become apparent from the following detailed description, taken in conjunction with the accompanying drawings, which illustrate, by way of example, the principles of the disclosure. This description is given for the sake of example only, without limiting the scope of the disclosure. The reference figures quoted below refer to the attached drawings.

BRIEF DESCRIPTION OF THE DRAWINGS

FIGS. 12 to 14 show cross-sections and top views of intermediates obtained after various steps in the formation of a representative sensor according to another embodiment of the present disclosure. The top view is on the right. On the left is a vertical cross-section taken along the vertical dashed line shown in the top view. In the middle is a vertical cross-section taken along the horizontal dashed line shown in the top view.

Figure 1:
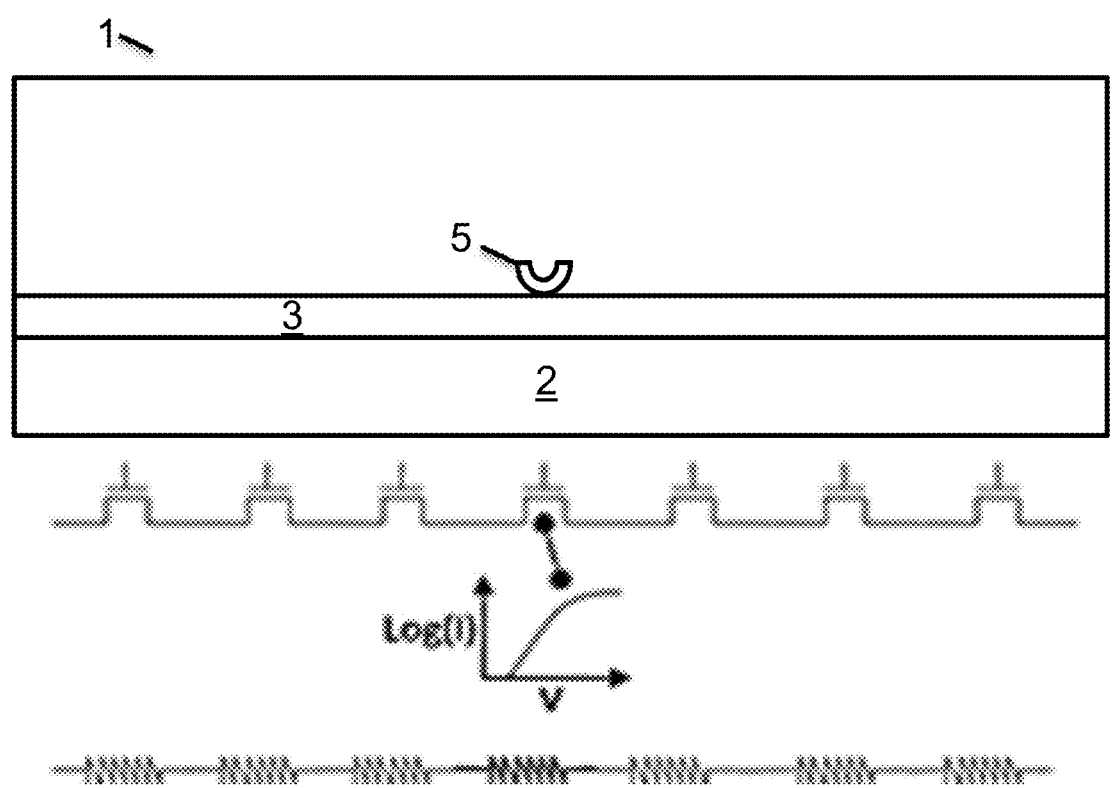
FIG. 1 shows a vertical cross-section of a conventional sensor in absence of analyte; below the cross-section is a schematic representation of the sensor channel as a series of virtual transistors; below the transistor corresponding to a section of the channel on which a molecular probe is present, is its corresponding graph of Log(I) as a function of V; below that graph is a schematic representation of the sensor channel as series of resistors.

In the different figures, the same reference signs refer to the same or analogous elements.

DESCRIPTION OF ILLUSTRATIVE EMBODIMENTS

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising means A and B" should not be interpreted as being limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various described aspects. This method of disclosure, however, is not to be interpreted as reflecting an intention that the claimed disclosure requires more features than are expressly recited in each claim. Rather, as the following claims reflect, various described aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the disclosure.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

The disclosure will now be described by a detailed description of several embodiments of the disclosure. It is clear that other embodiments of the disclosure can be configured according to the knowledge of persons skilled in the art without departing from the technical teaching of the disclosure, the disclosure being limited only by the terms of the appended claims.

In a first aspect, the present disclosure relates to a sensor comprising a field effect transistor (FET) comprising:
   an active region comprising:
      a source region and a drain region defining a source-drain axis,
      a channel region between the source region and the drain region,
   a dielectric region on the channel region, comprising at least a first zone on a first portion of the channel region and a second zone on a second portion of the channel region, the first zone measuring from 1 to 100 nm in the direction of the source-drain axis and being adapted to create a different threshold voltage for the first portion of the channel region than for the second portion of the channel region, and
   a fluidic gate region to which a top surface of the dielectric region is exposed.

The sensor may typically be for sensing a molecule (typically a charged molecule) in a liquid medium. Most typically, the molecule may be a biomolecule. Most typically, the liquid medium may be an aqueous electrolyte medium such as a biological fluid.

The sensor typically further comprises a solid gate electrode for applying a potential difference between the liquid electrolyte gate and the channel. In embodiments, the solid gate electrode may be placed so that it can come in physical and electrical contact with the liquid medium.

The active region comprises one or more semiconductor materials. In embodiments, the active region may comprise one or more group IV (e.g. Si, Ge, $Si_xGe_y$, or heterostructures of layers thereof) or III-V materials (e.g. GaAs). In embodiments, the active region may be made of Si. The source and the drain regions may be defined in the active region as two regions spatially separated from each other and being less resistive than the region separating them. They can, for instance, be formed by doping. The region separating the source and the drain can be the channel.

In embodiments, the active region may have a thickness (measured perpendicularly to a top surface of the active region) of at most 100 nm, generally at most 50 nm (for instance from 2 to 10 nm or from 2 to 5 nm). A thinner active region can prevent current from bypassing the region of altered (typically increased) resistance caused by the first zone of the dielectric region by running underneath it. The active region can take various forms such as the form of a layer or the form of a nanowire. It can for instance be made of Si (e.g. from Si bulk or from a SOI). To obtain an active region of a low thickness, the top semiconductor layer of an SOI (such as an Ultra thin SOI) can, for instance, be used. An alternative to obtaining an active region of a low thickness is to form the active region in a bulk Si substrate in which the part close to the channel has doping different from the rest of the Si bulk substrate (for instance, higher than the rest or lower than the rest).

The dielectric region on the channel region can be referred to as the gate dielectric. It can be made of a single material or of a combination of materials. It comprises at least a first zone and a second zone. In embodiments, it may comprise (or consist of) a first zone and a second zone wherein the second zone either surround the first zone or is split in two by the first zone. The first zone can be centred with respect to the channel but it can also be located closer to the source than to the drain or closer to the drain than to the source. In some embodiments, the first zone can be closer to the drain than to the source because the drain can be typically at a higher voltage, leading to effectively smaller channel-gate potential difference near the drain. The first zone may, however, typically not be adjacent to the source or to the drain, i.e. it is typically separated from both the source and the drain by the second zone.

In embodiments, where the second zone surrounds the first zone, the first zone may have any shape such as a square shape, a round shape or an irregular shape.

In embodiments, a nanocavity or nanopore may cross the channel perpendicularly to the source-drain axis and may open in the first zone. The present disclosure may be, however, particularly useful when the channel is not crossed by a nanocavity or a nanopore.

In embodiments, the first zone may measure (i.e. have a length of) from about 1 to 100 nm in the direction of the source-drain axis. In embodiments, the length of the first zone along the source-drain axis may range from 1 to 50 nm. In embodiments, the length of the first zone may range from 1 to 50%, from 1 to 25%, from 10 to 35%, or from 15 to 25%, of the channel length. Small dimensions for the first zone can be achieved for instance by using self-aligned multiple (e.g. double) patterning.

In embodiments, the width of the first zone (measured in the plane of the top surface of the first zone and perpendicularly to the source drain axis) may be at least 50%, at least 75%, or at least 90% of the width of the channel. In some embodiments, the first zone occupies the whole width of the channel (and thereby splits the second zone in two).

In embodiments, the width of the channel may range from 3 to 60 nm.

In embodiments, where the second zone is split in two by the first zone, the first zone may have the shape of a strip (e.g. it is thicker than the second zone) or of a slit (i.e. it is thinner than the second zone). The longitudinal extent of the slit or strip may be typically perpendicular to the source drain axis.

In any embodiments, the first zone may be demarcated from the second zone by a difference of material, a difference of height (i.e. a difference in thickness), a difference in doping, or a combination thereof.

Examples where the first zone is demarcated from the second zone by a difference of material (i.e. the first zone and the second zone differ in their chemical composition) include, but are not limited to, the following configurations. The first zone may be made of a first bulk material and the second zone may be made of a second bulk material (e.g. two different dielectric materials, eventually differing in their k-value). The first zone may be composed of a different number of layers of different materials than the second zone. The first zone and the second zone may be composed of the same number of layers of the same material but in different orders so that the layer forming the top surface of the first zone is of a different material than the layer forming the top surface of the second zone. The first zone and the second zone may be made different by functionalizing their top surfaces differently. For instance, the first zone and the second zone may be made of a single layer of the same bulk dielectric material, but their top surfaces may be functionalized differently (e.g. providing a difference in charge density). This can, for instance, be achieved by forming a self-assembled monolayer on the first zone or on the second zone, or by forming a different self-assembled monolayer on the first zone and on the second zone. In embodiments, the first and second zone may both have a same self-assembled monolayer thereon, in which case the first and the second zone may differ in other aspects. The self-assembled monolayer may be formed of molecules having a functional group for attaching to the top surface of the single dielectric layer, a functional group for providing surface properties, and a linker for linking both functional groups. The surface property sought after may, for instance, be an electrical property (e.g. via charged groups), an antifouling property (e.g. via bovine serum albumin), or may be a selectivity toward the analyte (e.g. via a molecular probe). The functional group for providing surface properties may, for instance, be charged in presence of the liquid medium in which the analyte is present. Examples of functional groups for providing the surface properties may be neutral hydrophilic groups (e.g. polyethylene glycol), charged hydrophilic groups (e.g. COOH or $NH_3$ which are susceptible to be charged in an aqueous medium depending on the pH), hydrophobic groups (e.g. alkanes), or biomolecules (e.g. the protein bovine serum albumin). The functional group for attaching to the top surface may, for instance, be silane groups (e.g. for functionalizing $SiO_2$), or phosphonic acid groups (e.g. for functionalizing $Al_2O_3$ or $HfO_2$).

In embodiments, the top surface of the second zone may belong to a $SiO_2$ layer while the top surface of the first zone may belong to a layer of another dielectric material.

For instance, the second zone may be made of a layer or $SiO_2$ while the first zone may be made of a layer of $SiO_2$ with another dielectric material on top thereof. Examples of dielectric materials for the other dielectric material include high-k dielectric materials. Examples of high-k materials comprise but are not limited to $Al_2O_3$, $HfO_2$, SiON, $Si_3N_4$, and $Ta_2O_5$.

Examples where the first zone is demarcated from the second zone by a difference of height (i.e, the first zone and the second zone differ in thickness) may include, but are not limited to, the following configurations. The first zone may be thicker/higher than the second zone. The first zone may be thinner/lower than the second zone.

For instance, the first zone may comprise a strip of a further material on a first dielectric material common to both the first and the second zone. As another example, the first zone may be delimited by a slit in a further material on a first dielectric material.

The local channel resistance may be different underneath the slit or strip (i.e. in the first portion of the channel) than in the second portion of the channel.

In other embodiments, the further layer/material may be a dielectric layer.

In some embodiments, the local channel resistance may be larger underneath the slit or strip (i.e. in the first portion of the channel) than in the second portion of the channel.

In other embodiments, the further layer/material may be a dielectric layer.

The first zone may also be demarcated from the second zone by a difference in doping. In some of these embodiments, the field effect transistor may be of an n-type and the first zone may be negatively doped while the second zone may be less negatively doped or positively doped; or the field effect transistor may be of a p-type and the first zone may be positively doped while the second zone may less positively doped or negatively doped. In some embodiments, when the first zone and/or the second zone is doped, the corresponding first and second portions of the channel may not be doped or present a lower dopant concentration than the corresponding first and/or second zone.

In embodiments, a top surface of the first zone may be charged differently than a top surface of the second zone. In some of these embodiments, the field effect transistor may be of an n-type and the top surface of the first zone may be negatively charged while the top surface of the second zone may less negatively charged or positively charged, or the field effect transistor may be of a p-type and the top surface of the first zone may be positively charged while the top surface of the second zone may less positively charged or negatively charged. When the first zone is said to be charged, it is meant that it is such that it can be charged when in contact with an aqueous medium (e.g. with a biological fluid).

When the first zone is said to be adapted to create a different threshold voltage for the first portion of the channel region than for the second portion of the channel region, it is not necessary to quantify this difference. It is enough if the first zone has been adapted so that there is a difference. Ways to achieve a difference in threshold voltage for the first portion may, for instance, be achieved by having the first zone differing from the second zone in the following way: a difference in thickness, a difference in material (for instance providing a difference in k-value), a difference in doping, or a combination thereof.

Although quantification of the difference is not necessary for the disclosure to work, in embodiments, the first zone may be adapted to create a difference in threshold voltage of at least 1 mV, at least 2 mV, or at least 3 mV in the first portion of the channel region with respect to the second portion. Larger differences may provide larger sensitivity and selectivity.

The threshold voltage can be evaluated by using usual simulation softwares well known to the person skilled in the art. The threshold voltage can be approached by the following formula:

$$V_T = V_{FB} - 2\phi_n - \frac{t_{ox}}{\varepsilon_{ox}}\sqrt{2\varepsilon_{Si}qN_D(2\phi_n)}$$

Wherein $V_T$ is the threshold voltage in the portion of interest (e.g. first portion) of the channel region, $V_{FB}$ is the flatband voltage given by the formula $$V_{FB} = -(\phi_m - \phi_n) - Q_I\frac{t_{ox}}{\varepsilon_{ox}},$$

$\phi_n$ is the potential of the portion of interest of the channel region, $\phi_\mu$ is the potential of the gate electrode, $Q_I$ is the dielectric charge density at the interface between the zone of interest of the dielectric region (e.g. first zone) and the portion of interest of the channel region (e.g. first portion), $t_{ox}$ is the thickness of the zone of interest of the dielectric region, $\varepsilon_{Ox}$ is the dielectric constant of the zone of interest of the dielectric region, $\varepsilon_{Si}$ is the dielectric constant of the portion of interest of the channel region, q is the electronic charge, $N_D$ is the doping of the portion of interest of the channel region, The amount of charge inside the dielectric can impact the threshold voltage through the flatband voltage which has the term $Q_I$. Any charge inside the dielectric can be translated into an equivalent $Q_I$.

In embodiments, the field effect transistor may either be of an n-type and the first zone can adapted to create a higher (more positive) threshold voltage for the first portion of the channel region than for the second portion of the channel region, or the field effect transistor may be of a p-type and the first zone can be adapted to create a lower threshold voltage (more negative) for the first portion of the channel region than for the second portion of the channel region. In other words, the field effect transistor may either be of an n-type or of a p-type and the first zone may be adapted to create a higher resistance in the first portion of the channel region than in the second portion of the channel region.

In embodiments of the first aspect, the present disclosure relates to a sensor comprising a field effect transistor (FET) comprising:
an active region comprising:
  a source region and a drain region defining a source-drain axis,
  a channel region between the source region and the drain region,
  a dielectric region on the channel region, comprising at least a first zone on a first portion of the channel region and a second zone on a second portion of the channel region, the first zone measuring from 1 to 100 nm in the direction of the source-drain axis and wherein the following applies:
    a top surface of the first zone may be charged differently than a top surface of the second zone, and/or
    the first zone may differ from the second zone by the materials it comprises, and/or
    the first zone may differ from the second zone by its thickness, and/or
    the first zone may differ from the second zone by its doping, and
  a fluidic gate region to which a top surface of the dielectric region is exposed.

In some of the embodiments where the field effect transistor may be either of an n-type and the first zone may be adapted to create a higher threshold voltage for the first portion of the channel region than for the second portion of the channel region, or the field effect transistor may be of a p-type and the first zone may be adapted to create a lower threshold voltage for the first portion of the channel region than for the second portion of the channel region, the top surface of the first zone may have a point of zero charge differing by at least 1 with respect to the point of zero charge of the top surface of the second zone. In some of these embodiments, the field effect transistor may be of an n-type and the top surface of the first zone may have a point of zero charge lower than the point of zero charge of the top surface of the second zone or the field effect transistor may be of a p-type and the top surface of the first zone may have a point of zero charge higher than the point of zero charge of the top surface of the second zone.

For instance, in some of these embodiments, the field effect transistor may be of an n-type and the top surface of the first zone may be $SiO_2$ having a point of zero charge of about 2 while the top surface of the second zone may be $HfO_2$ having a point of zero charge of about 7.

As another example, the field effect transistor may be of an p-type and the top surface of the first zone may be $HfO_2$ having a point of zero charge of about 7 while the top surface of the second zone may be $SiO_2$ having a point of zero charge of about 2.

In embodiments, the first zone and the second zone may comprise a common dielectric layer wherein the first zone or the second zone comprises a further layer (made of the same or of a different dielectric material) creating the different threshold. In embodiments, the common dielectric layer may be on the channel region (e.g. only) and the further layer may be on the common dielectric layer. For instance, the further layer may form a slit or a strip on the common dielectric layer. In these embodiments, if it is the first zone that comprises a further layer, the first zone can have a larger thickness than the second zone and if it is the second zone that comprises a further layer, the second zone can have a larger thickness that the first zone. In other embodiments, the further dielectric layer (made of the same material or of another material) may form part of the first or of the second zone and may be on the channel region while the common dielectric layer may be on the channel region and on the further dielectric layer. In these embodiments, if the first zone that comprises a further layer, the first zone can typically have a larger thickness than the second zone and if it is the second zone that comprises a further layer, the second zone can typically have a larger thickness that the first zone. It is, however, possible to form the common dielectric layer made of a first material on top of the further layer made of a second material, different from the first material, in such a way that the top surface of the dielectric region can be planar. This can be achieved, for instance, by overfilling a split in the further dielectric layer with a liquid precursor to the common dielectric layer before to form the common dielectric layer from said precursor.

When the different threshold voltage is higher in absolute value, this means that the local resistance in the first portion of the channel region can be larger than in the second portion of the channel region. This, in turn, means that the contribution of the first portion of the channel to the total resistance of the channel can be large relatively to the area it occupies. This, in turn, means that if a gate potential approaching (e.g. subthreshold operation) or surpassing in absolute value (and of same sign than) of the threshold voltage of the first zone is applied between the source and the drain, the presence of a target molecule on the first zone can induce a larger change in the total resistance than the presence of that same target molecule on the second zone. It is also possible to use such a device by applying a gate potential intermediate between the threshold voltage of the first zone and the threshold voltage of the second zone (subthreshold operation). In such embodiments, this gate voltage can be below (in absolute value) the threshold voltage of the first zone by an amount smaller than the decrease (in absolute value) in threshold voltage caused by the target molecule when it is present on the first zone. That way, significantly more current passes if a target molecule is present on the first zone than otherwise.

The fluidic gate region can be located above the dielectric region and can be suitable for exposing the dielectric region to the liquid medium. In some embodiments, the fluidic gate region can be filled with the liquid medium. The liquid medium can typically be an electrolyte containing the analyte and serving as a liquid gate. In some embodiments, the fluidic gate region can be at least partially empty or not filled with a liquid. In some embodiments, at least some of the fluidic gate region can be filled with air. In some embodiments, an inlet can be located on one side of the fluidic gate region and an outlet can be located on the opposing side of the fluidic gate region. In some embodiments, a cover can be located above the fluidic gate region and the fluidic gate region can be defined by the cover, the dielectric region and sidewalls (e.g. connecting the cover and the dielectric region).

In embodiments, a molecular probe, for specifically binding a target molecule to be detected by the sensor, may be attached to the exposed surface of the first zone. Examples of molecular probes include enzymes, antibodies, ligands, receptors, peptides, and oligo- or poly-nucleotides.

In a second aspect, the present disclosure relates to a biosensing device comprising a sensor according to any embodiment of the first aspect.

In a third aspect, the present disclosure may relate to a process for forming a sensor according to any one of the preceding claims, comprising the steps of:
  a. Providing an active region (typically on a substrate), the active region having a source region, a drain region and a channel region therebetween,
  b. Providing a dielectric region on the channel region, the dielectric region comprising at least a first zone on a first portion of the channel region and a second zone on a second portion of the channel region, the first zone measuring from 1 to 100 nm and usually from 1 to 50 nm in the direction of the source-drain axis and being adapted to create a different threshold voltage for the first portion of the channel region than for the second portion of the channel region, and
  c. Providing a fluidic gate region to which a top surface of the dielectric region is exposed.

In embodiments, the process further comprises coupling a gate electrode to the source for applying a potential difference between the gate and the source. In embodiments, the gate electrode may be placed so that it can come in physical and electrical contact with the liquid medium.

Any feature of the third aspect may be as correspondingly described for the first aspect.

In a fourth aspect, the present disclosure relates to a method for detecting the possible presence of an analyte in a liquid medium.

In an embodiment, the method may comprise the steps of:
  a. Providing a sensor according to any embodiment of the first aspect,
  b. Applying a gate potential and measuring a first current between the source region (8) and the drain region (9),
  c. Introducing the liquid medium potentially containing the analyte in the fluidic gate region, and
  d. Measuring a second current between the source region and the drain region, thereby detecting the analyte.

After step c, the first zone is in contact with the liquid medium.

Step b of applying a gate potential can form instance comprise applying a gate potential having a value larger than the threshold potential of the second portion.

In an embodiment, the gate potential applied in step b may have a value intermediate between the threshold potential of the first portion and the threshold potential of the second portion of the channel region.

In another embodiment, the gate potential applied in step b may have a value larger in absolute value and of same sign than the threshold potential of the first portion and the threshold potential of the second portion of the channel region.

The analyte (also referred to herein as the target molecule) can be typically a biomolecule (such as a protein or a polynucleotide single strand) or a biological entity (such as an organelle or a cell). In some embodiments, it is a charged molecule.

One way to perform a measurement is to introduce a reset solution (electrolyte solution without the analyte) into the fluidic gate region; recording a reset value, introducing a sample containing an analyte into the fluidic gate region; recording a sensing value; and obtain a difference between the sensing value and the reset value.

The measurement of the first current in step b can for instance be measured without a liquid in the fluidic region, with a liquid medium not containing the analyte (e.g. a reset solution), or with a liquid medium comprising a known concentration of the analyte (e.g. a reference solution).

If step b is performed in presence of a liquid in the fluidic region, step c can comprise replacing that liquid by the liquid medium potentially containing the analyte.

In step d, detecting the analyte typically comprises comparing the first and the second current. A difference between these currents indicates the presence of an analyte.

We now refer to FIG. 1 which shows a sensor according to the prior art. The source and the drain are not depicted but they would be present respectively on the left and the right of the channel (2). In a simplified picture, along the length of the channel, the sensor (1) can be represented by a chain of transistors or as a chain of resistors in a circuit schematic. A molecular probe (5) is shown on a dielectric region (3). A graph of the Log(I) as a function of V, where I is the current intensity and V is the gate potential, is depicted for the local area of the channel where the molecular probe is present.

Figure 2:
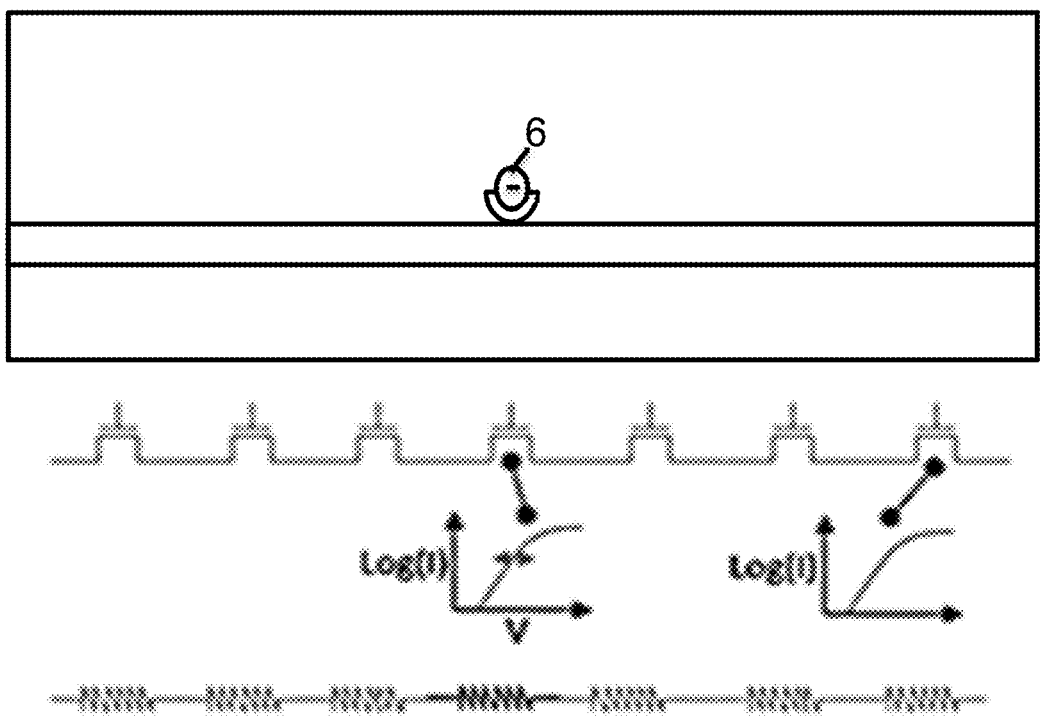
FIG. 2 shows the vertical cross-section of FIG. 1 in presence of an analyte and the changes to the graph of Log(I) as a function of V resulting from this presence.

We now refer to FIG. 2. Docked charged target molecules (6) cause a local threshold shift which changes the resistance. Because the local resistance underneath a docked molecule can be small compared to the resistance of the entire channel, a change in this local resistance induced by the docked molecule can result in a small overall resistance modulation.

Figure 3:
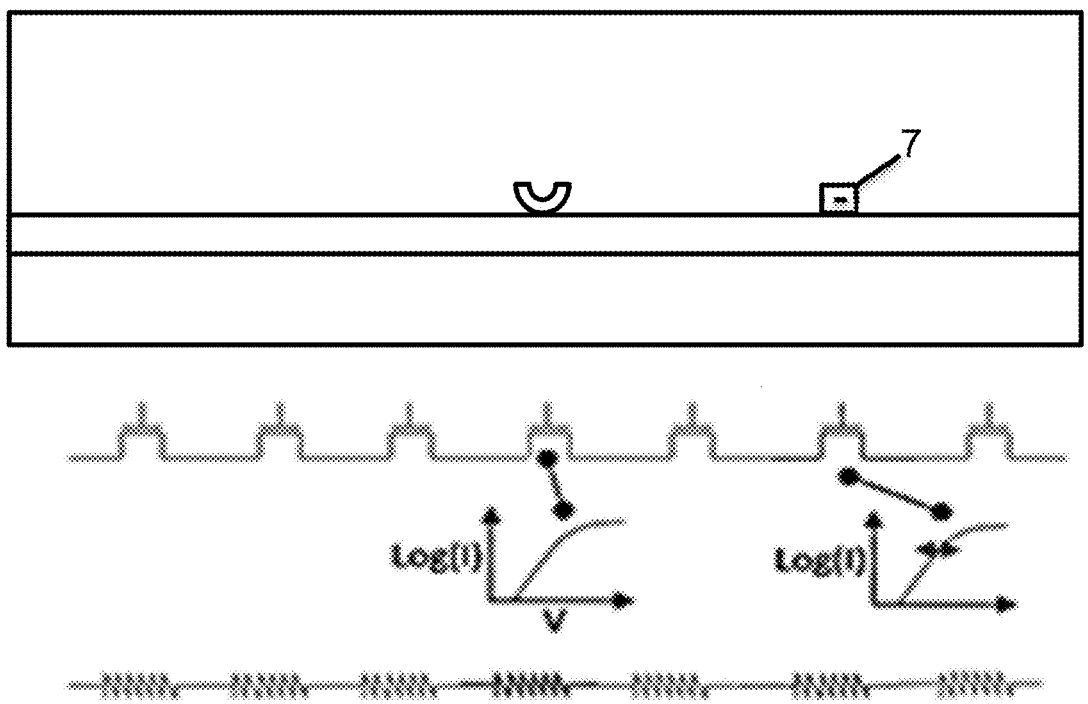
FIG. 3 shows the vertical cross-section of FIG. 1 in presence of a fouling molecule and the changes to the graph of Log(I) as a function of V resulting from this presence.

We now refer to FIG. 3. A fouling molecule (7) which does not dock onto the target binding site (which only dock the target molecule) but attaches non-specifically to the gate dielectric causes a similar modulation of resistance and hence results in a false positive signal.

Figure 4:
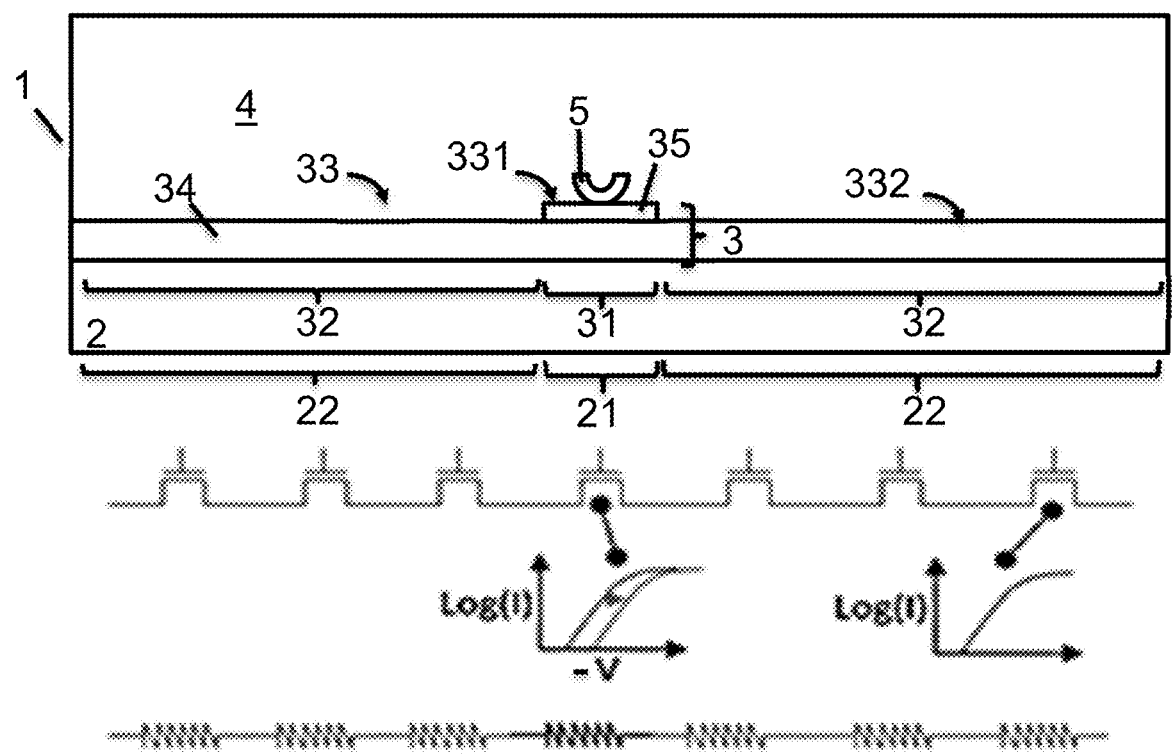
FIG. 4 shows a vertical cross-section of a representative sensor according to an embodiment of the present disclosure in absence of analyte; below the cross-section is a schematic representation of the representative sensor channel as a series of virtual transistors; below the transistor corresponding to a section of the first portion of the channel on which a molecular probe is present, is its corresponding graph of Log(I) as a function of V; below the transistor corresponding to a section of the second portion of the channel on which a molecular probe is not present, is its corresponding graph of Log(I) as a function of V; below these graphs are a schematic representation of the sensor channel as series of resistors.

We now refer to FIG. 4 which shows an pMOS sensor (1) according to an embodiment of the present disclosure. The sensor comprises a field effect transistor which comprises an active region. The active region comprises a source region and a drain region (not shown) defining a source-drain axis. The active region further comprises a channel region (2) between the source region and the drain region. The field effect transistor further comprises a dielectric region (3) composed of a common dielectric layer (34) (e.g. $SiO_2$) covering the first (31) and the second (32) portion of the channel and comprises a further dielectric strip (35) (e.g. $HfO_2$). This dielectric region (3) is on the channel region. This dielectric region (3) comprises at least a first zone (31) on a first portion (21) of the channel region and a second zone (32) on a second portion (22) of the channel region. The first zone measures from 1 to 100 nm in the direction of the source-drain axis. The first zone has a top surface (331) while the second zone has a top surface (332). Both top surfaces differ in their chemical nature, thereby participating to the formation of a lower threshold voltage (more negative) for the first portion of the channel region than for the second portion of the channel region.

The field effect transistor further comprises a fluidic gate region (4) to which a top surface (33) of the dielectric region is exposed.

Figure 5:
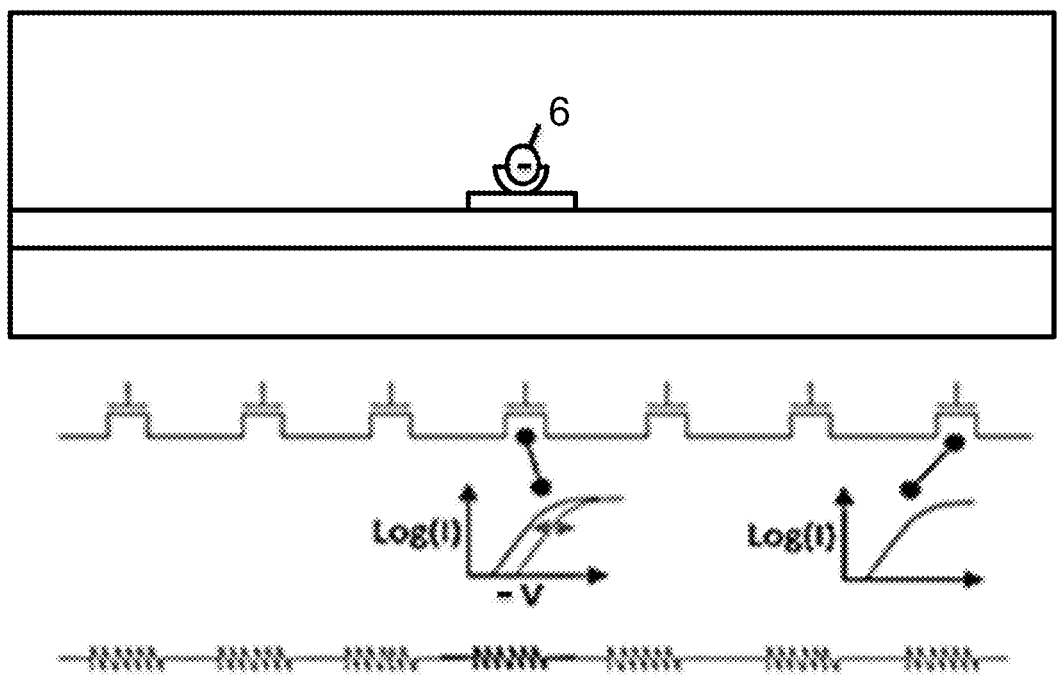
FIG. 5 shows the vertical cross-section of FIG. 4 in presence of an analyte and the changes to the graphs of Log(I) as a function of V resulting from this presence.

We now refer to FIG. 5. As a consequence, when the target charged molecule docks onto a target binding site on the strip, the change in resistance measured by the sensor is larger because the resistance underneath the strip is high compared to the rest of the channel.

Figure 6:
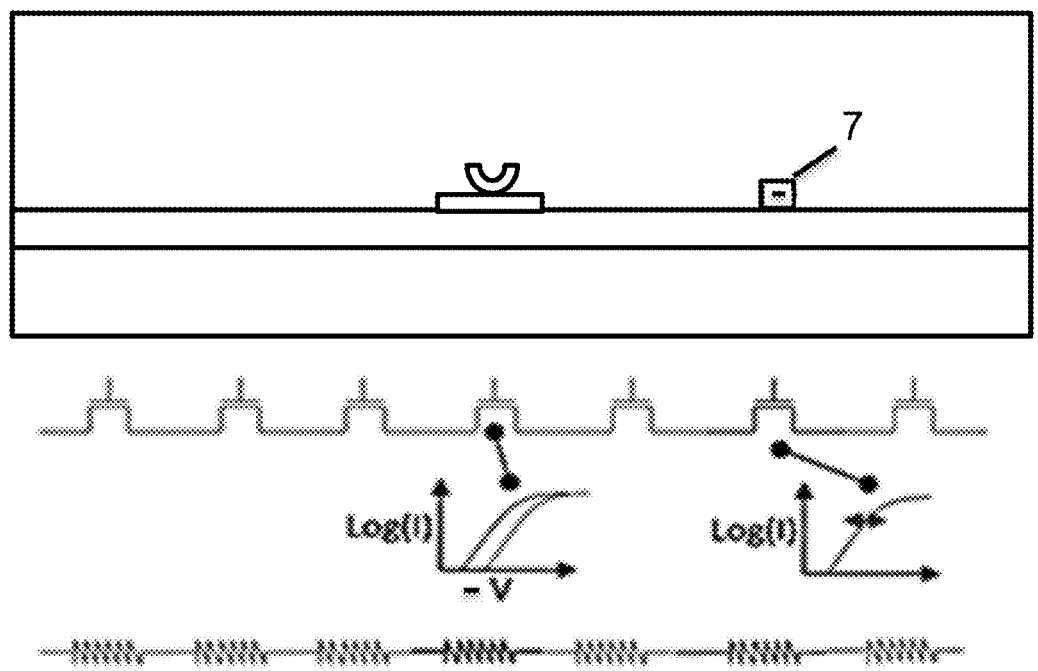
FIG. 6 shows the vertical cross-section of FIG. 4 in presence of a fouling molecule and the changes to the graphs of Log(I) as a function of V resulting from this presence.

We now refer to FIG. 6. When a molecule binds non-specifically on the channel surface next to the strip the modulation caused by this molecule is smaller than that by the target molecule on the strip due to the relatively lower local resistance of the remainder of the channel.

Figure 7:
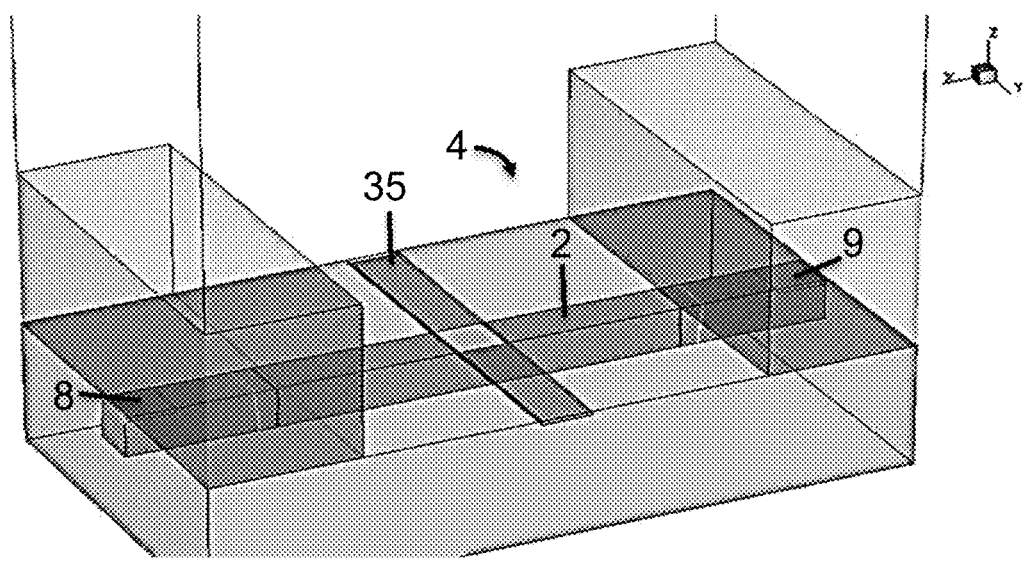
FIG. 7 is a Technology Computer Aided Design (TCAD) simulation setup of a representative sensor according to an embodiment of the present disclosure.

FIG. 7 shows a Technology Computer Aided Design (TCAD) simulation setup of a sensor according to an embodiment of the present disclosure. It simulated an active region having a 10 nm×5 nm cross-section and comprising a source (8), a drain (9) and a 2e17 $cm^{-3}$ n-type doped channel (2) therebetween. The dielectric region comprising a first and a second zone was simulated by a 1 nm thick common $SiO_2$ dielectric layer covering the whole channel and corresponding to the second zone (not visible) and a $Si_3N_4$ strip (35) on the common dielectric layer to form the first zone. The dielectric strip has a width equal to the width of the channel. A fluidic gate region (4) was simulated as containing water and 0.154 mol/l NaCl as the electrolyte. Another simulation setup was performed, identical to the one of FIG. 7, except for the absence of the strip of further dielectric material. In absence of the dielectric strip, the modulation created by one electron charge placed 1 nm above the common dielectric layer, when a 15 mV s/d bias is applied, was 1 mV. Both simulations were repeated for an active region having a 10 nm×10 nm cross-section.

Figure 8:
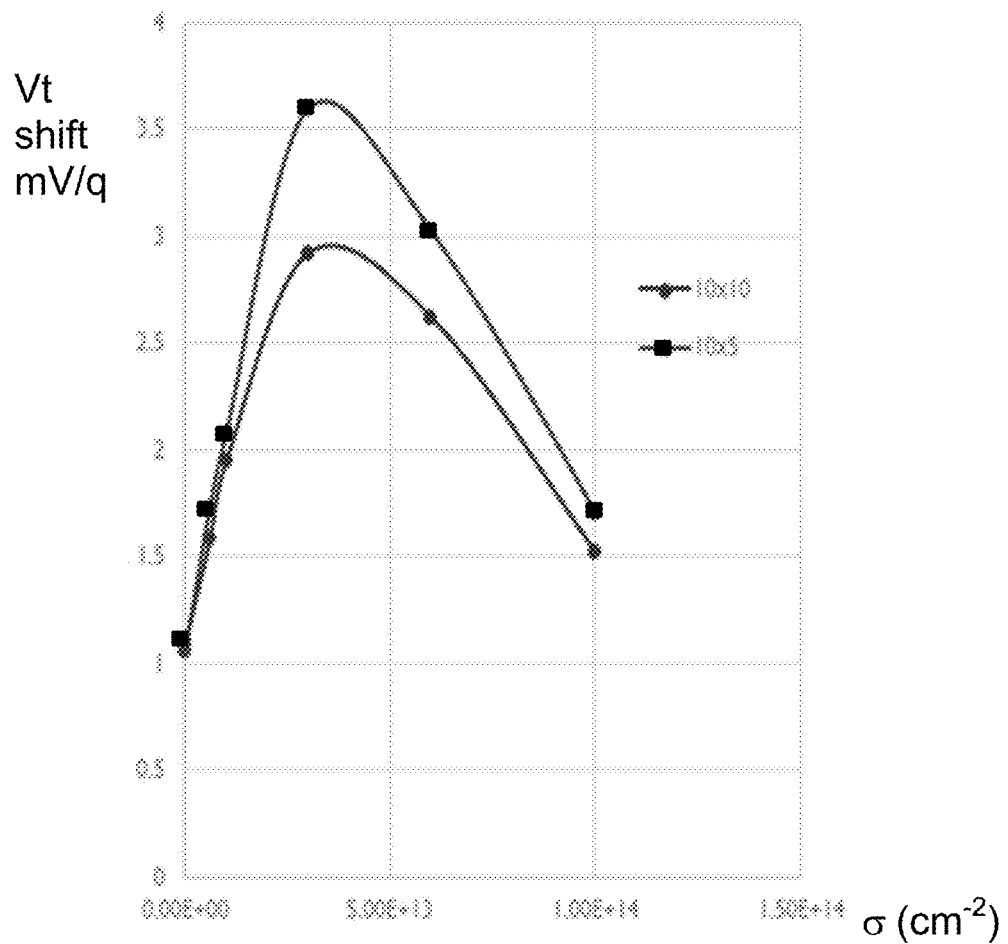
FIG. 8 is a Graph showing the shift in threshold voltage as a function of the negative volume charge density for simulations as shown in FIG. 7.
Figure 9:
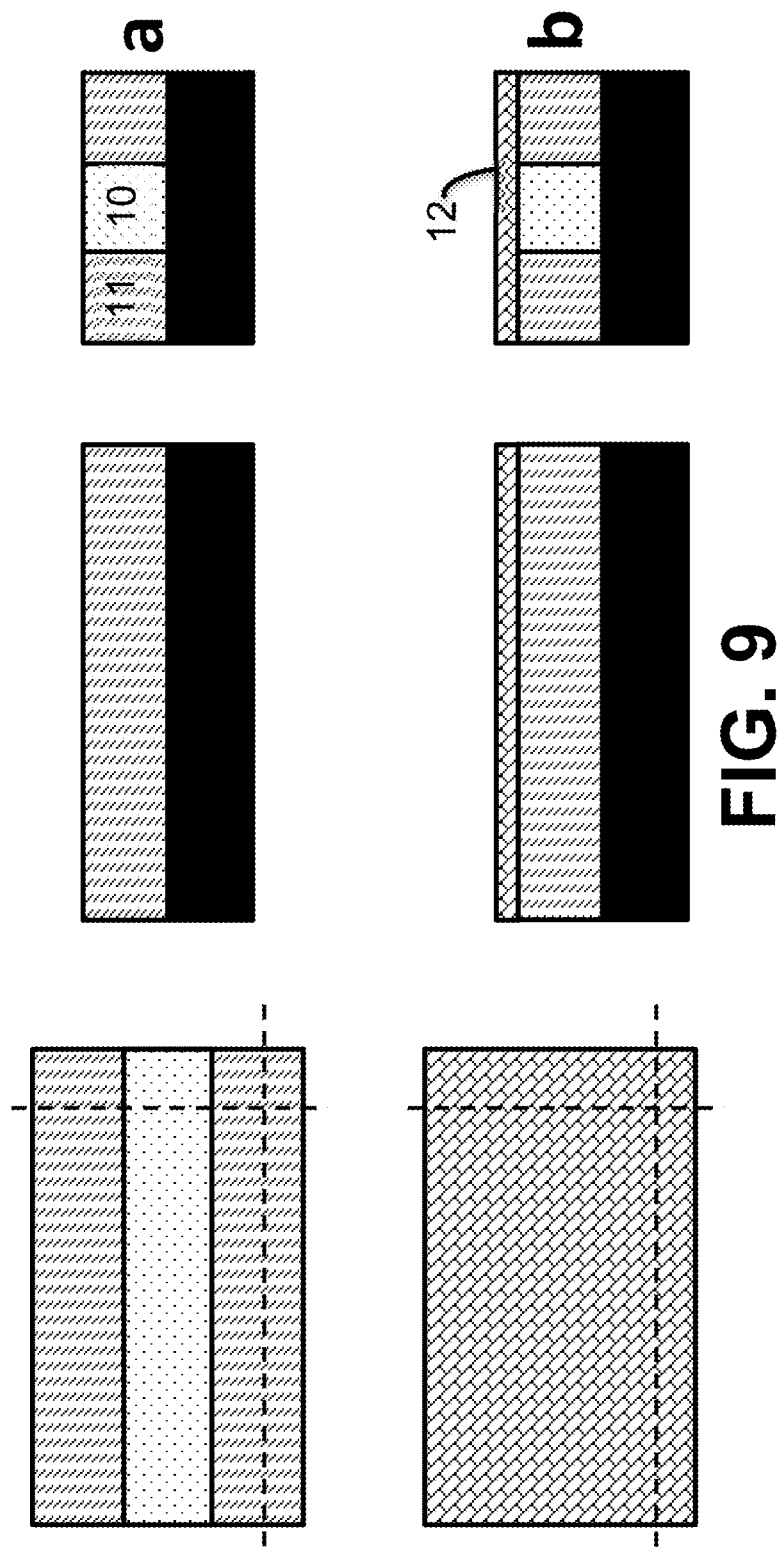
FIGS. 9 to 11 show cross-sections and top views of intermediates obtained after various steps in the formation of a representative sensor according to an embodiment of the present disclosure. The top view is on the right. On the left is a vertical cross-section taken along the vertical dashed line shown in the top view. In the middle is a vertical cross-section taken along the horizontal dashed line shown in the top view.
Figure 10:
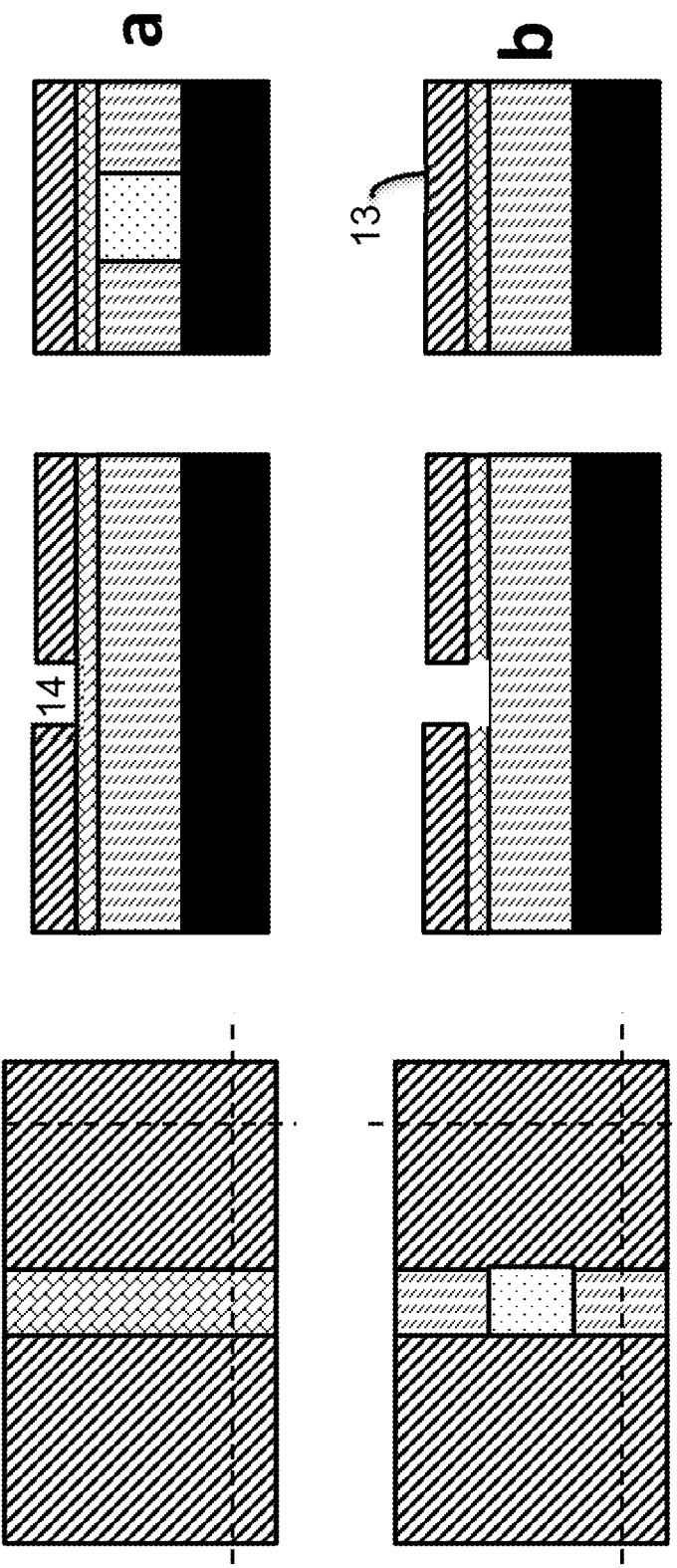
Figure 11:
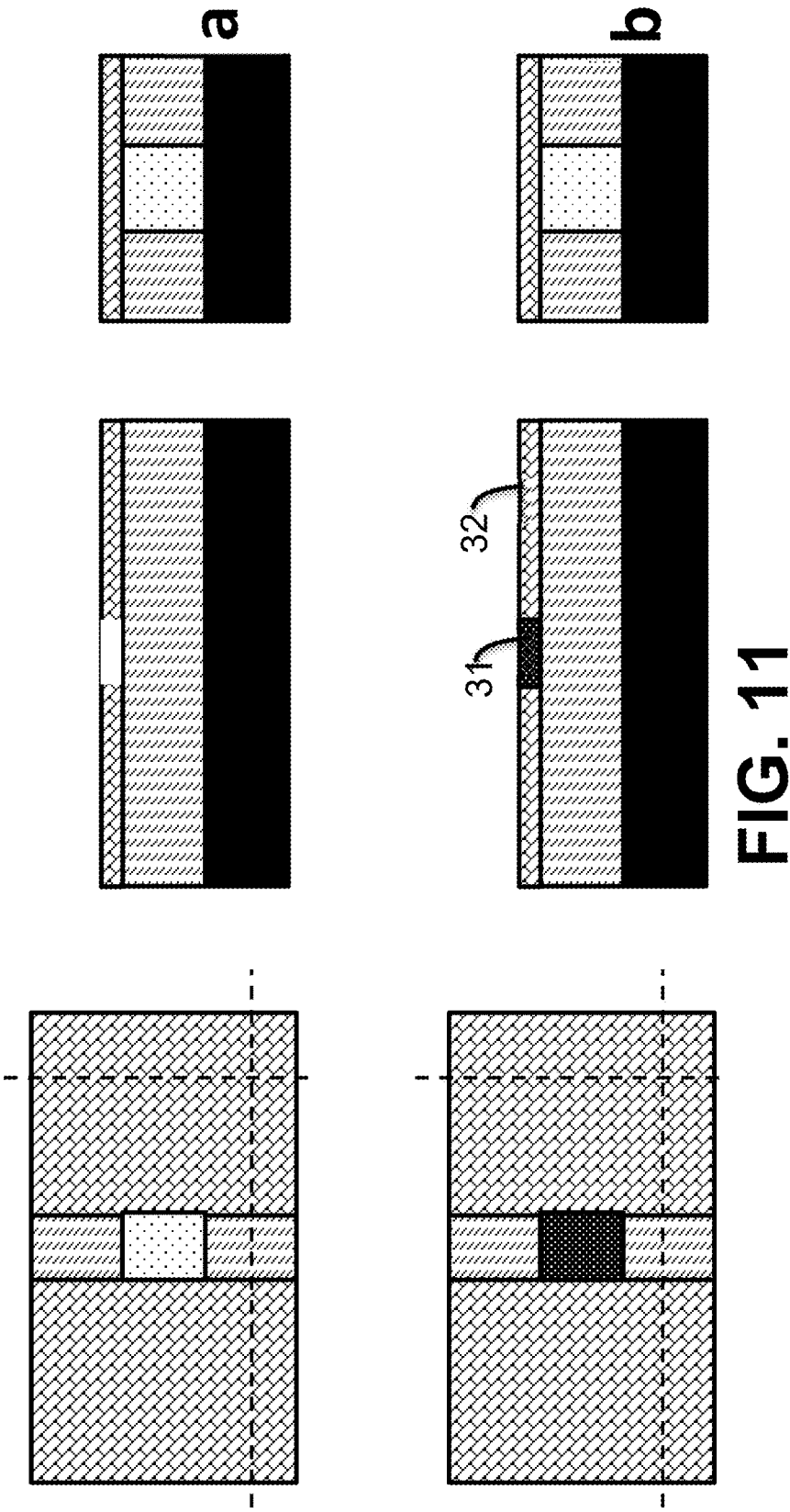
Figure 12:
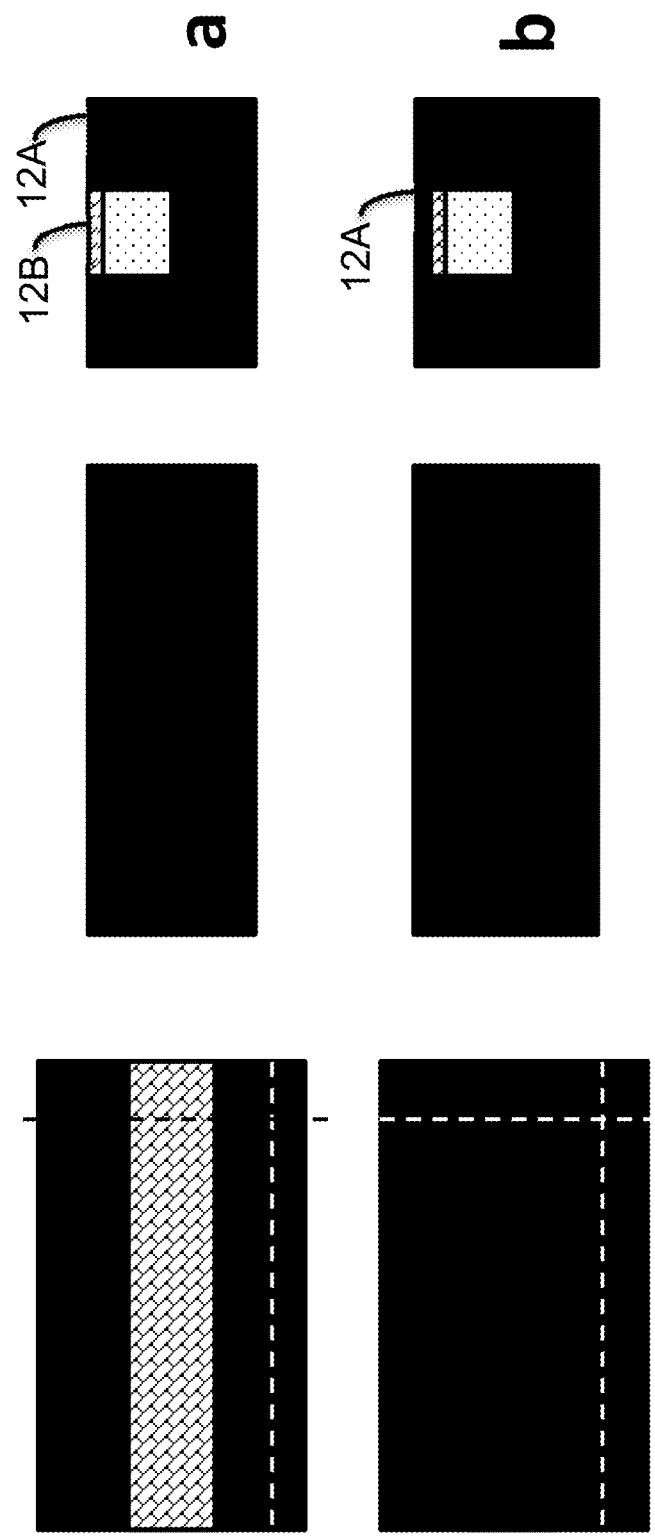
Figure 13:
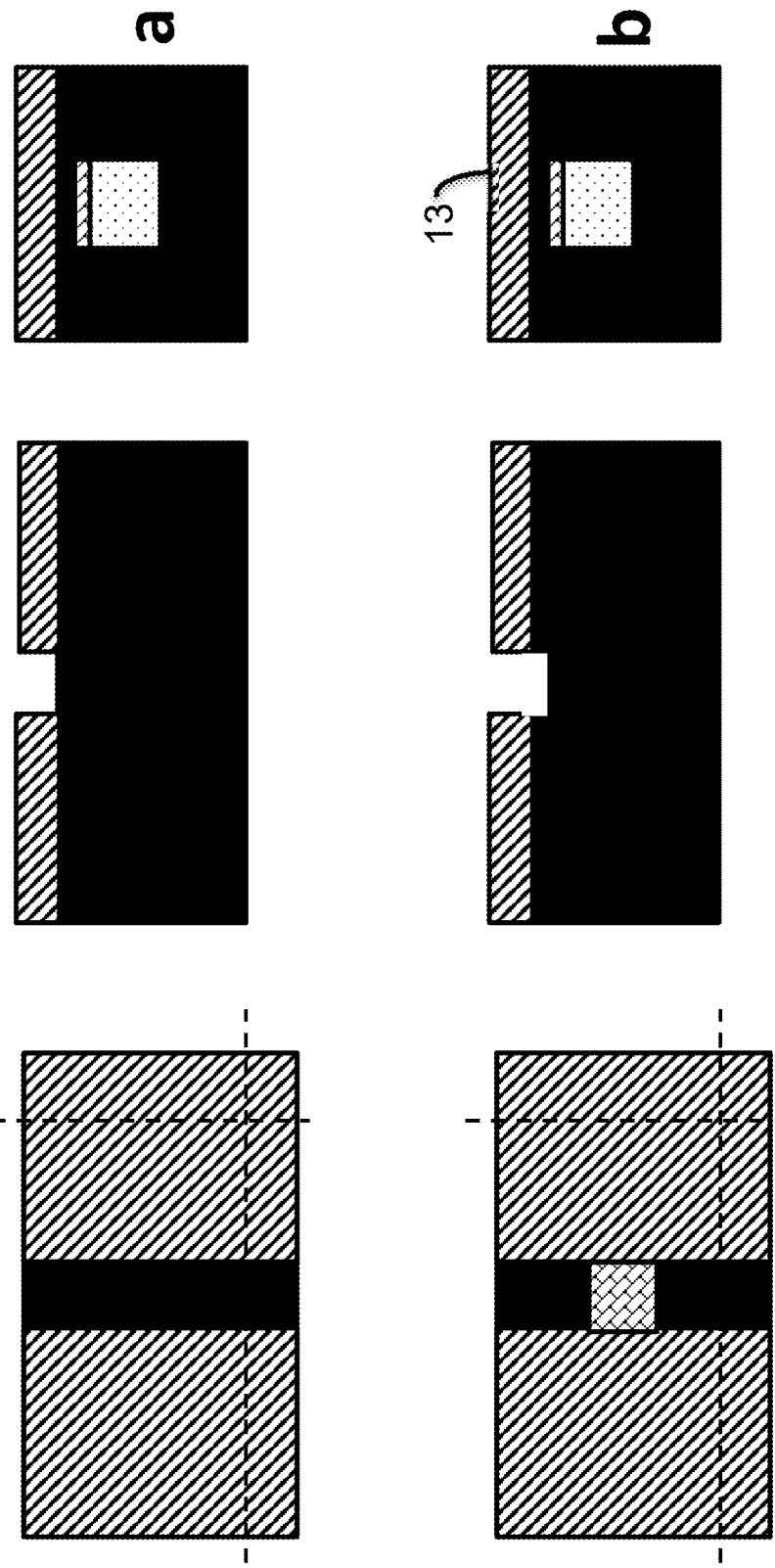

The dependence of the modulation of threshold voltage (Vt shift, mV/q) is shown as a function of the charge density ($cm^{-2}$) at the surface of the dielectric strip in FIG. 8. The calculations showed that the threshold modulation increases from 1 mV to about 3 mV (10 nm×10 nm) or 3.5 mV (10 nm×5 nm) by introducing the dielectric strip. The threshold modulation was therefore better when the channel was thinner. It was further observed that the enhancement obtained depended on the extent of the strip along the source-drain axis, channel dimensions and charges of the dielectric. The thickness of the channel (measured perpendicularly to the top surface of the channel surface) was shown to play a role given that current seek to bypass the mobile charge decrease induced by the dielectric and the molecular charge by running deeper in the channel. This can be countered by thinning the channel by e.g. working with Ultra thin SOI or quantum wells such as SiGe/Si. Concerning the dimensions of the first zone, the shorter the first zone along the source-drain axis, the more efficiently a molecule will be able to modulate a sufficiently large part of the slit or strip. However, below a certain length, gating becomes inefficient. The size of the slit or strip can be defined to be below <100 nm and down to a few nanometers by making use of e.g. self-aligned double patterning (SADP).

We now refer to FIGS. 9 to 14 where it is shown that an area for selective functionalization can be defined both longitudinally and transversally. In a first approach, one starts from an active region (10) embedded in an isolation material (11) which features a non-$SiO_2$ dielectric on the surface ($Al_2O_3$ or $HfO_2$ for instance, but not limited to these, FIG. 9a). Then an ALD or CVD dielectric coating (12) is deposited (for instance $HfO_2$ or $Al_2O_3$, materials are not limited to these, FIG. 9b). Using SADP for instance a (hard)mask (13) can be formed with a nanometer sized slit (14) (FIG. 10a). Then using this mask (13) the underlying dielectric coating (12) can be etched (wet and/or dry), in this particular case down to the Si channel of the active layer 10) (FIG. 10b), one may also stop on $SiO_2$. The mask (13) can then be stripped (FIG. 11a). Finally, and optionally, the $SiO_2$ (31) can be regrown on the longitudinally and transversally defined nano-sized area on the channel (2) (FIG. 11b). Hence one obtains a nano-sized surface (31) of $SiO_2$ which can additionally be differentially functionalized with molecules vs. the surrounding material (32).

One may also obtain a longitudinally and transversally defined non-native oxide area to be functionalized selectively. This can be obtained by starting off with an active region (10) embedded in an insulating matrix (with on top dielectric material 12A) in which the channel can be covered by a different ALD or CVD coating of dielectric (material 12B) (FIG. 12a). Next, one deposits material 12A (FIG. 12b). Material 12A can then nano-patterned by using SADP for instance (FIGS. 13a, 13b, and 14). This opens a patch of material 12B, 31 which can eventually be functionalized differentially vs. the surrounding material 12A, 32.

It is to be understood that although embodiments, specific constructions and configurations, as well as materials, have been discussed herein for devices according to the present disclosure, various changes or modifications in form and detail may be made without departing from the scope of this disclosure. For example, any formulas given above are merely representative of procedures that may be used. Functionality may be added or deleted from the block diagrams and operations may be interchanged among functional blocks. Steps may be added or deleted to methods described within the scope of the present disclosure.

What we claim:

1. A sensor comprising a field effect transistor comprising:
an active region comprising:
a source region and a drain region defining a source-drain axis, and
a channel region between the source region and the drain region, the channel region comprising a first portion and a second portion;
a dielectric region on the channel region, the dielectric region composed of a common dielectric layer covering the first portion and the second portion of the channel region, the dielectric region comprising at least a first zone on the first portion of the channel region and a second zone on the second portion of the channel region, the first zone measuring from 1 to 100 nm in the direction of the source-drain axis and being adapted to create a different threshold voltage for the first portion of the channel region than for the second portion of the channel region; and
a fluidic gate region to which a top surface of the dielectric region is exposed.

2. The sensor according to claim 1, wherein the first zone is adapted to create a difference in threshold voltage of at least 1 mV in the first portion of the channel region with respect to the second portion.

3. The sensor according to claim 1, wherein the field effect transistor is either of an n-type and the first zone is adapted to create a higher threshold voltage for the first portion of the channel region relative to the second portion of the channel region, or the field effect transistor is of a p-type and the first zone is adapted to create a lower threshold voltage for the first portion of the channel region relative to the second portion of the channel region.

4. The sensor according to claim 2, wherein the field effect transistor is either of an n-type and the first zone is adapted to create a higher threshold voltage for the first portion of the channel region relative to the second portion of the channel region, or the field effect transistor is of a p-type and the first zone is adapted to create a lower threshold voltage for the first portion of the channel region relative to the second portion of the channel region.

5. The sensor according to claim 1, wherein a top surface of the first zone is charged differently than a top surface of the second zone.

6. The sensor according to claim 5, wherein either the field effect transistor is of an n-type and the top surface of the first zone is negatively charged while the top surface of the second zone is less negatively charged or is positively charged, or the field effect transistor is of a p-type and the top surface of the first zone is positively charged while the top surface of the second zone is less positively charged or is negatively charged.

7. The sensor according to claim 5, wherein the top surface of the first zone has a point of zero charge differing by at least 1 with respect to the point of zero charge of the top surface of the second zone.

8. The sensor according to claim 7, wherein either the field effect transistor is of an n-type and the top surface of the first zone has a point of zero charge lower than the point of zero charge of the top surface of the second zone or the field effect transistor is of a p-type and the top surface of the first zone has a point of zero charge higher than the point of zero charge of the top surface of the second zone.

9. The sensor according to claim 6, wherein the top surface of the first zone has a point of zero charge differing by at least 1 with respect to the point of zero charge of the top surface of the second zone.

10. The sensor according to claim 9, wherein either the field effect transistor is of the n-type and the top surface of the first zone has a point of zero charge lower than the point of zero charge of the top surface of the second zone or the field effect transistor is of a p-type and the top surface of the first zone has a point of zero charge higher than the point of zero charge of the top surface of the second zone.

11. The sensor according to claim 1, wherein the first zone and the second zone differ in thickness.

12. The sensor according to claim 1, wherein the first zone and the second zone differ in their chemical composition.

13. The sensor according to claim 1, wherein the first zone and the second zone comprise a common dielectric layer on the active region and wherein the first zone or the second zone comprise a further layer creating the different threshold.

14. The sensor according to claim 1, wherein a molecular probe, for specifically binding a target molecule to be detected by the sensor, is attached to the surface of the first zone.

15. The sensor according to claim 1, wherein a width of the first zone is at least 50% of a width of the channel.

16. A biosensing device comprising one or more sensors according to claim 1.

17. A method for detecting the possible presence of an analyte in a liquid medium, the method comprising:
(a) providing a sensor according to claim 1;
(b) applying a gate potential and measuring a first current between the source region and the drain region;
(c) introducing the liquid medium potentially containing the analyte in the fluidic gate region; and
(d) measuring a second current between the source region and the drain region, thereby detecting the analyte.

18. A process for forming a sensor according to claim 1, comprising the steps of:
(a) providing an active region, the active region having a source region, a drain region and a channel region therebetween, the channel region comprising a first portion and a second portion;
(b) providing a dielectric region on the channel region, the dielectric region composed of a common dielectric layer covering the first portion and the second portion of the channel region, the dielectric region comprising at least a first zone on a first portion of the channel region and a second zone on the second portion of the channel region, the first zone measuring from 1 to 100 nm in the direction of the source-drain axis and being adapted to create a different threshold voltage for the first portion of the channel region than for the second portion of the channel region; and
(c) providing a fluidic gate region to which a top surface of the dielectric region is exposed.

19. The process according to claim 18, wherein the active region is on a substrate.

20. The method according to claim 19, wherein the first zone measures from 1 to 50 nm.

21. A method for detecting the possible presence of an analyte in a liquid medium, the method comprising:
(a) providing a sensor, the sensor comprising a field effect transistor comprising:
an active region comprising:
a source region and a drain region defining a source-drain axis, and
a channel region between the source region and the drain region;

a dielectric region on the channel region, comprising at least a first zone on a first portion of the channel region and a second zone on a second portion of the channel region, the first zone measuring from 1 to 100 nm in the direction of the source-drain axis and being adapted to create a different threshold voltage for the first portion of the channel region than for the second portion of the channel region; and a fluidic gate region to which a top surface of the dielectric region is exposed;

(b) applying a gate potential and measuring a first current between the source region and the drain region;

(c) introducing the liquid medium potentially containing the analyte in the fluidic gate region; and (d) measuring a second current between the source region and the drain region, thereby detecting the analyte.

* * * * *